(12) United States Patent
Malik et al.

(10) Patent No.: US 6,630,753 B2
(45) Date of Patent: Oct. 7, 2003

(54) LOW COST REDUNDANT AC TO DC POWER SUPPLY

(75) Inventors: Randhir S. Malik, Cary, NC (US); Diep N. Ho, Raleigh, NC (US); Vijay V. Oak, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 10/016,555

(22) Filed: Oct. 29, 2001

(65) Prior Publication Data

US 2003/0080625 A1 May 1, 2003

(51) Int. Cl.[7] .................................................. H02J 9/06
(52) U.S. Cl. .............................. 307/64; 307/80; 307/86; 363/70
(58) Field of Search ............................. 307/64, 80, 85, 307/86, 87; 363/69, 70, 126

(56) References Cited

U.S. PATENT DOCUMENTS

| | | | | |
|---|---|---|---|---|
| 3,662,182 A | * | 5/1972 | Ullman et al. ................. 307/64 |
| 4,672,226 A | * | 6/1987 | Sutherland .................... 307/85 |
| 4,761,563 A | | 8/1988 | Ross et al. ..................... 307/87 |
| 4,811,163 A | * | 3/1989 | Fletcher ........................ 307/64 |
| 5,138,184 A | * | 8/1992 | Keefe ........................... 307/64 |
| 5,386,147 A | | 1/1995 | Bonneau et al. ............... 307/64 |
| 5,644,175 A | | 7/1997 | Galm ........................... 307/131 |
| 5,790,394 A | | 8/1998 | Cabaniss et al. .............. 363/65 |
| 5,814,904 A | | 9/1998 | Galm ........................... 307/130 |
| 5,881,215 A | | 3/1999 | Alft ....................... 395/182.12 |
| 6,011,327 A | | 1/2000 | Cook et al. .................. 307/125 |
| 6,031,298 A | | 2/2000 | Lo et al. ....................... 307/64 |
| 6,317,346 B1 | * | 11/2001 | Early .......................... 363/70 |
| 6,542,023 B1 | * | 4/2003 | Daun-Lindberg et al. ..... 307/85 |

* cited by examiner

Primary Examiner—Jeffrey Sterrett
(74) Attorney, Agent, or Firm—Sawyer Law Group

(57) ABSTRACT

The power supply in accordance with the present invention provides AC redundancy while also preventing voltages from multiple AC voltage sources from adding at a common node. The adding of voltages is avoided by ensuring that only one AC voltage source at a time is providing the voltage at the output. Even if the other AC voltage sources are connected afterwards, these later AC voltage source are prevented from providing power at the output. In addition, diodes prevent current from back flowing to the AC voltage sources which are not supplying power to the output. Because the power supply in accordance with the present invention neither uses redundant AC to DC power supplies from independent AC voltage sources, nor does it use a costly transfer switch, the power supply in accordance with the present invention is more cost effective than conventional redundant power supplies.

35 Claims, 3 Drawing Sheets

US 6,630,753 B2

LOW COST REDUNDANT AC TO DC POWER SUPPLY

FIELD OF THE INVENTION

The present invention relates to power supplies, and more particularly to redundancy in power supplies.

BACKGROUND OF THE INVENTION

Redundant AC to DC power supplies are well known in the art. FIG. 1 illustrates a first conventional circuit for providing redundant AC to DC power. The circuit 100 comprises a first AC voltage source 102 coupled to a first power supply 106 in a first power train. The circuit 100 also comprises a second AC voltage source 104 coupled to a second power supply 108 in a second power train. The DC voltages from the first 106 and second 108 power supplies are combined and provided as DC outputs. However, this conventional circuit requires two independent power supplies 106 and 108 connected to two separate AC sources. This adds to the cost of the power system.

FIG. 2 illustrates a second conventional redundant AC power system. The system 200 comprises a first AC voltage source 202 and a second AC voltage source 204. Both sources provide AC voltages to an AC transfer switch 206. The transfer switch 206 supplies either the voltage from the first AC voltage source 202 or the voltage from the second AC voltage source 204 to a power supply 208, which provides DC outputs. However, the transfer switch 206 is very expensive, adding significant cost to the circuit 200.

Accordingly, there exists a need for a low cost redundant AC to DC power supply. This power supply should provide AC power redundancy in a cost effective manner. The present invention addresses such a need.

SUMMARY OF THE INVENTION

The power supply in accordance with the present invention provides AC redundancy while also preventing voltages from multiple AC voltage sources from adding at a common node. The adding of voltages is avoided by ensuring that only one AC voltage source at a time is providing the voltage at the output. Even if the other AC voltage sources are connected afterwards, these later AC voltage source are prevented from providing power at the output. In addition, diodes prevent current from back flowing to the AC voltage sources which are not supplying power to the output. Because the power supply in accordance with the present invention neither uses redundant AC to DC power supplies from independent AC voltage sources, nor does it use a costly transfer switch, the power supply in accordance with the present invention is more cost effective than conventional redundant power supplies.

DETAILED DESCRIPTION

The present invention provides a low cost redundant AC to DC power supply. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The power supply in accordance with the present invention provides redundancy while also preventing voltages from multiple AC voltage sources from adding. The adding of voltages is avoided by ensuring that only one AC voltage source at a time is providing a voltage at the output. Even if the other AC voltage sources are connected afterwards, these later AC voltage sources are prevented from providing power at the output. In addition, currents are prevented from back flowing to the AC voltage sources which are not supplying power to the output.

To more particularly describe the features of the present invention, please refer to FIG. 3 in conjunction with the discussion below.

Figure 1:
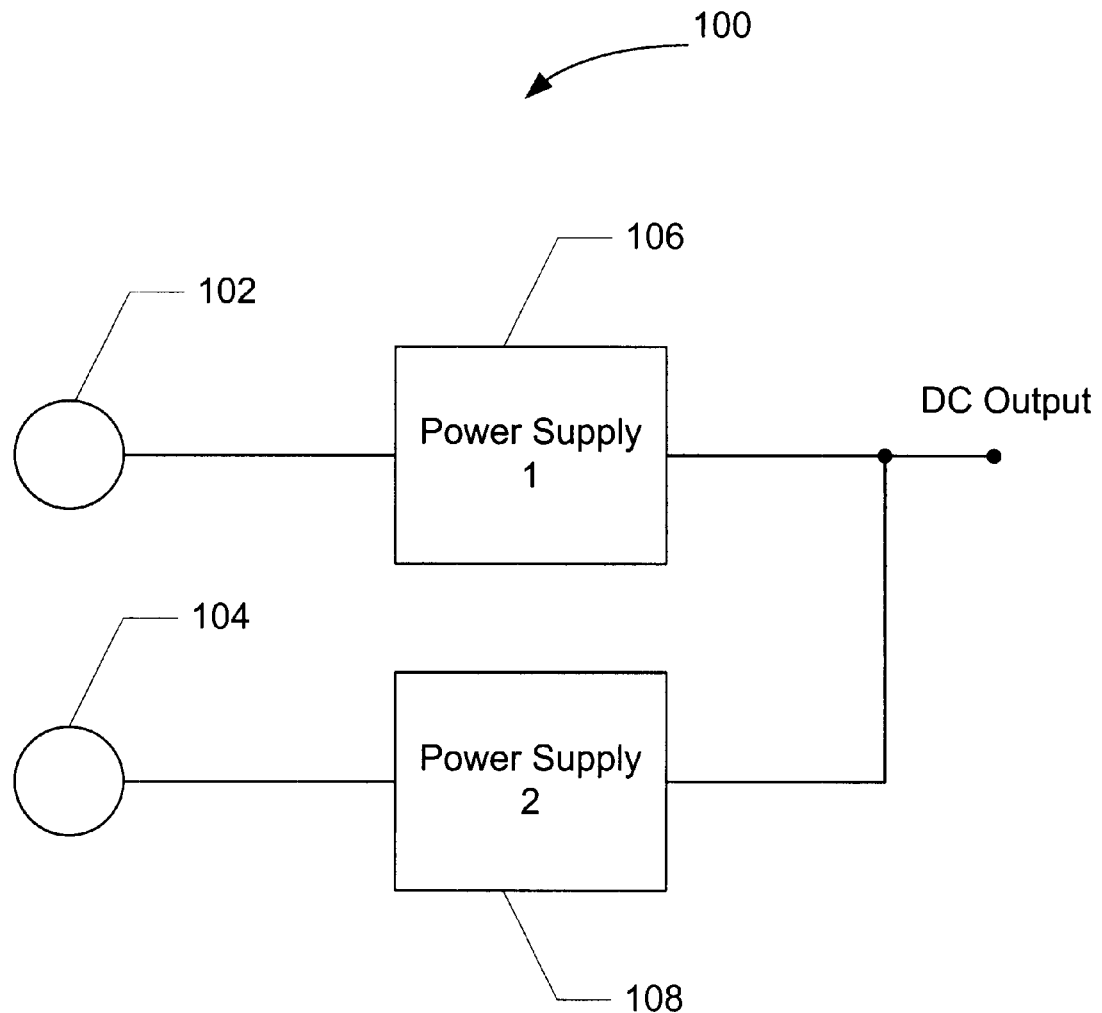
FIG. 1 illustrates a first conventional circuit for providing redundant AC to DC power.
Figure 2:
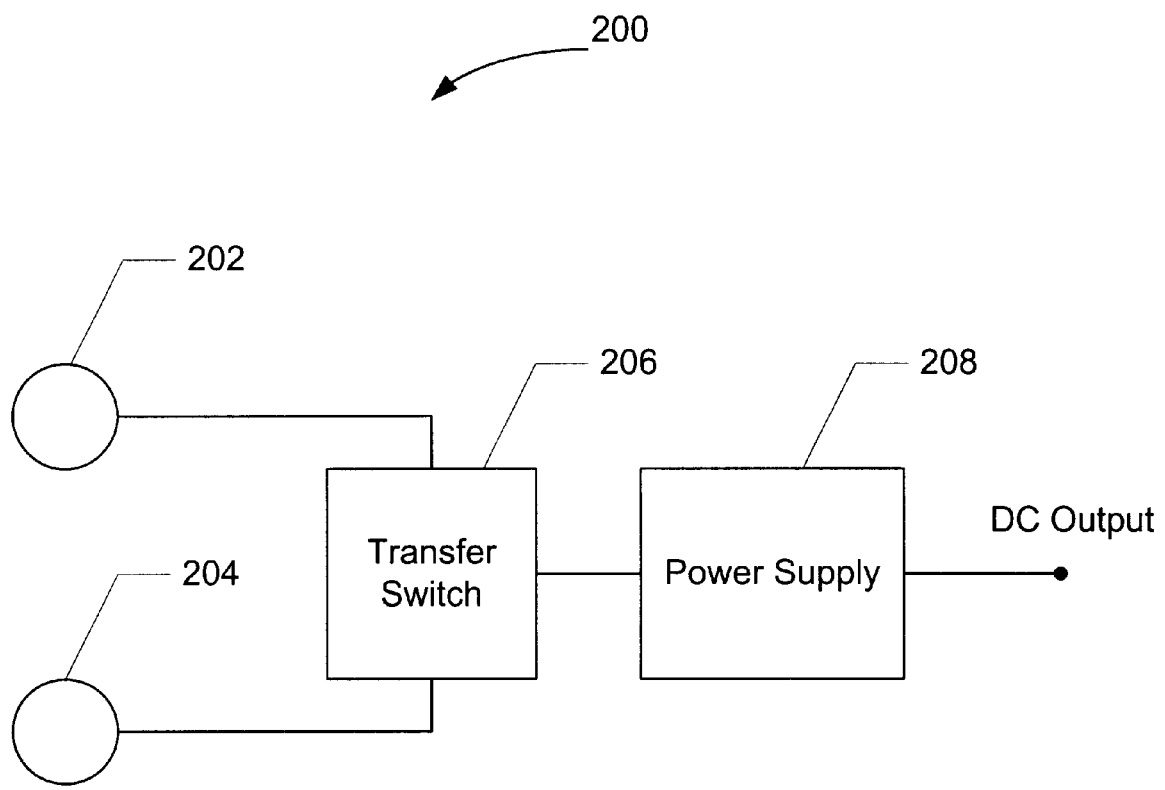
FIG. 2 illustrates a second conventional redundant AC power system.
Figure 3:
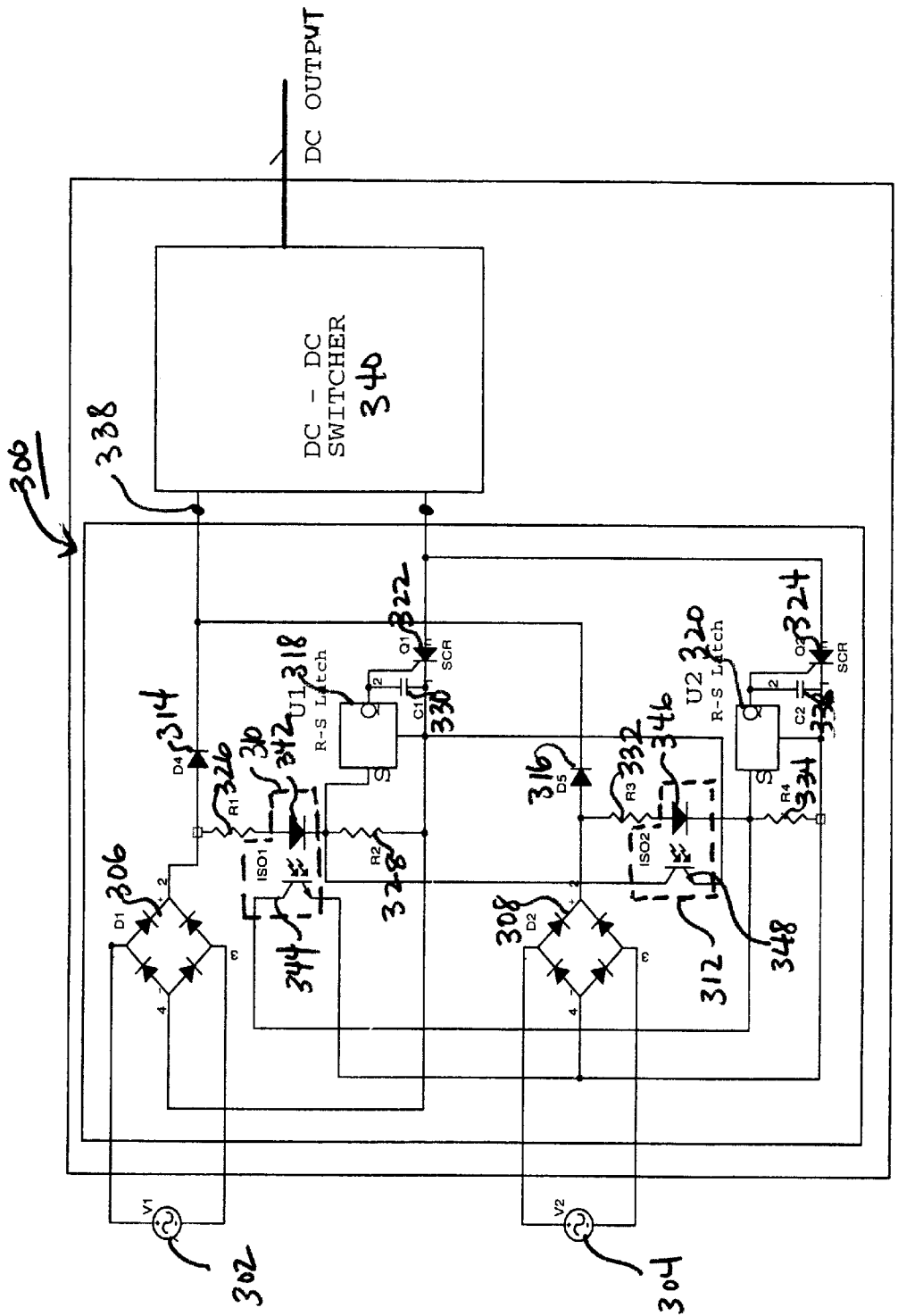
FIG. 3 illustrates a preferred embodiment of a redundant AC to DC power supply in accordance with the present invention.

FIG. 3 illustrates a preferred embodiment of a redundant AC to DC power supply in accordance with the present invention. The power supply 300 comprises leads for voltages from a first AC voltage source 302 and a second AC voltage source 304. The power supply 300 comprises a first bridge rectifier 306 (D1). The first and third nodes of D1 306 are coupled to the first AC voltage source 302. Coupled to a second node of D1 306 is a resistor 326 (R1) and an anode of diode 314 (D4). The cathode of D4 314 is coupled to an output 338. In the preferred embodiment, a DC—DC switcher 340 is coupled to the output 338.

Coupled to R1 326 is a first opto-coupler 310. The first opto-coupler 310 comprises a diode 342 and a transistor 344. The diode 342 of the first opto-coupler 310 is coupled to a resistor 328 (R2). R2 328 is coupled to a fourth node of the first bridge rectifier 306. Coupled to the common node of diode 342 and R2 328 is a first set-reset latch 318. Coupled to the first latch 318 is a gate of a first silicon controller rectifier (SCR) 322 (Q1). The anode of Q1 322 is coupled to the DC—DC switcher 340. The cathode of Q1 322 is coupled to R2 328 and the fourth node of the first bridge rectifier 306. Coupled to the gate and cathode of Q1 322 is a capacitor 330 (C1).

The power supply 300 further comprises a second bridge rectifier 308 (D2). The first and third nodes of D2 308 are coupled to the second AC voltage source 304. Coupled to a second node of D2 308 is a resistor 332 (R3) and an anode of diode 316 (D5). The cathode of D5 316 is coupled to the output 338. Coupled to R3 332 is a second opto-coupler 312. The second opto-coupler 312 comprises a diode 346 and a transistor 348. The transistor 348 is coupled across R2 328. The diode 346 of the second opto-coupler 312 is coupled to a resistor 334 (R4). The transistor 344 of the first opto-coupler 310 is coupled across R4 334. R4 334 is also coupled to a fourth node of D2 308. Coupled to the common node of diode 346 and R4 334 is a second set-reset latch 320. Coupled to the second latch 320 is a gate of a second SCR 324 (Q2). The anode of Q2 324 is coupled to the DC—DC switcher 340. The cathode of Q2 324 is coupled to R4 334 and the fourth node of the second bridge rectifier 308. Coupled to the gate and cathode of Q2 324 is a capacitor 336 (C2).

Assume that the first AC voltage source 302 is connected to the power supply 300 before the second AC voltage source 304. The voltage, V1, from the first AC voltage source 302 is rectified by D1 306. The rectified voltage turns "on" the first opto-coupler 310. Current flows through R1 326, the diode 342, and R2 328. This causes the S pin of the first latch 318 to go high, setting the first latch 318. The setting of the first latch 318 turns Q1 322 "on". A current path is thus created from D1 306 to D4 314, to the DC—DC switcher 340, Q1 322, and back to D1 306. The first AC voltage source 302 thus is providing power at the output 338.

With the transistor 344 "on" and connected across R4 334, the voltage across R4 334 is approximately zero volts. The S pin of the second latch 320 remains low, so the second latch 320 is not set, and Q2 324 is not turned "on". Thus, only the first AC voltage source 302 is providing power to the output 338.

Assume that after the first AC voltage source 302 is connected to the power supply 300, the second AC voltage source 304 is connected to the power supply 300 at any phase angle. The voltage, V2, from the second AC voltage source 304 is rectified by D2 308. The rectified voltage turns "on" the second opto-coupler 312. Current will flow through R3 332, diode 346, and R4 334. However, since transistor 344 of the first opto-coupler 310 is "on", the voltage across R4 334 remains approximately zero volts. The second latch 320 remains unset, and Q2 324 remains "off". Since the transistor 348 of the second opto-coupler 312 is now "on", the voltage across R2 328 becomes approximately zero volts. However, since the first latch 318 has not been reset, it remains in the set state, and Q1 322 remains "on". Thus, the first AC voltage source 302 remains the only one providing power to the output 338.

The second AC voltage source 304 becomes the source providing power to the output 338 when the first AC voltage source 302 is disconnected. Disconnecting the first AC voltage source 302 resets the first latch 318. It allows the S pin of the first latch 318 to go low, turning "off" Q1 322. The voltage provided to the output 338 by the first AC voltage source 302 is removed. The first opto-coupler 310 is also turned "off". This removes the short across R4 334, allowing the S pin of the second latch 320 to go high, setting the second latch 320. Setting the second latch 320 turns Q2 324 "on". A current path is thus created from D2 308 to D5 316, to the DC—DC switcher 340, Q2 324, and back to D2 308. Thus, the second AC voltage source 304 is the only one providing power to the output 338.

The power supply 300 functions in the same manner when the second AC voltage source 304 is connected to the power supply 300 before the first voltage source 302. The voltage, V2, from the second AC voltage source 304 is rectified by D2 308. The rectified voltage turns "on" the second opto-coupler 312. Current flows through R3 332, the diode 346, and R4 334. This causes the S pin of the second latch 320 to go high, setting the second latch 320. The setting of the second latch 320 turns Q2 324 "on". A path is thus created from D2 308 to D5 316, to the DC—DC switcher 340, Q2 324, and back to D2 308. The second AC voltage source 304 thus is providing power at the output 338.

With the transistor 348 "on" and connected across R2 328, the voltage across R2 328 is approximately zero volts. The S pin of the first latch 318 remains low, and the first latch 318 is not set. Q1 322 is not turned "on". Thus, only the second AC voltage source 304 is providing power to the output 338.

Assume that after the second AC voltage source 304 is connected to the power supply 300, the first AC voltage source 302 is connected to the power supply 300 at any phase angle. The voltage, V1, from the first AC voltage source 302 is rectified by D1 306. The rectified voltage turns "on" the first opto-coupler 310. Current will flow through R1 326, diode 342, and R2 328. However, since transistor 348 of the second opto-coupler 312 is "on", the voltage across R2 328 remains approximately zero volts. The first latch 318 remains unset, and Q1 322 remains "off". Since the transistor 344 of the first opto-coupler 310 is now "on", the voltage across R4 334 becomes approximately zero volts. However, since the second latch 320 has not been reset, it remains in the set state, and Q2 324 remains "on". Thus, the second AC voltage source 302 remains the only one providing power to the output 338.

The first AC voltage source 302 becomes the source providing power to the output 338 when the second AC voltage source 304 is disconnected. Disconnecting the second AC voltage source 304 resets the second latch 320. This allows the S pin of the second latch 320 to go low, turning "off" Q2 324. The voltage provided to the output 338 by the second AC voltage source 304 is removed. The second opto-coupler 312 is also turned "off". This removes the short across R2 328, allowing the S pin of the first latch 318 to go high, setting the first latch 318. Setting the first latch 318 turns Q1 322 "on". A current path is thus created from D1 306 to D4 314, to the DC—DC switcher 340, Q1 322, and back to D1 306. Thus, the first AC voltage source 302 becomes the only one providing power to the output 338.

The power supply 300 in accordance with the present invention provides AC redundancy while also preventing voltages from the first 302 and second 304 AC voltage sources from adding. This adding of voltages may occur if the AC voltage sources 302 and 304 are out of phase and of different amplitudes. The adding of voltages is avoided by ensuring that only one AC voltage source at a time is providing the voltage at the output. Even if the other AC voltage source is connected afterwards, this later AC voltage source is prevented from providing power at the output. In addition, diodes prevent current from back flowing to the AC voltage source which is not supplying power to the output. Because the power supply in accordance with the present invention does not use multiple power supplies in independent power trains, nor does it use a costly transfer switch, the power supply in accordance with the present invention is more cost effective.

Although the preferred embodiment is described above with two AC voltage sources, one of ordinary skill in the art will understand that the power supply may be modified for three or more AC voltage sources without departing from the spirit and scope of the present invention.

A low cost redundant AC to power supply using two independent AC voltage sources has been disclosed. The power supply in accordance with the present invention provides redundancy while also preventing voltages from multiple AC voltage sources from adding at a common node. In addition, current is prevented from back flowing to the AC voltage sources which are not supplying power to the output. Because the power supply in accordance with the present invention neither uses redundant AC to DC power supplies from independent AC voltage sources, nor does it use a costly transfer switch, the power supply in accordance with the present invention is more cost effective.

Although the present invention has been described in accordance with the embodiments shown, one of ordinary skill in the art will readily recognize that there could be variations to the embodiments and those variations would be within the spirit and scope of the present invention.

Accordingly, many modifications may be made by one of ordinary skill in the art without departing from the spirit and scope of the appended claims.

What is claimed is:

1. A circuit, comprising:
   a first opto-coupler coupled to a first voltage source;
   a first set-reset latch coupled to the first opto-coupler;
   a first resistor coupled to the first opto-coupler and the first set-reset latch;
   a first silicon controller rectifier (SCR) coupled to the first set-reset latch, the first resistor, the first voltage source, and a load;
   a first diode coupled to the first voltage source, the first opto-coupler, and the load;
   a second opto-coupler coupled to a second voltage source and across the first resistor;
   a second set-reset latch coupled to the second opto-coupler;
   a second resistor coupled to the second opto-coupler, the second set-reset latch, and the second voltage source, wherein the first opto-coupler is coupled across the second resistor;
   a second SCR coupled to the second set-reset latch, the second resistor, the second voltage source, and the load; and
   a second diode coupled to the second voltage source, the second opto-coupler, and the load.

2. The circuit of claim 1, further comprising:
   a first bridge rectifier coupled to the first voltage source; and
   a second bridge rectifier coupled to the second voltage source.

3. The circuit of claim 2, wherein the first opto-coupler is coupled to a node of the first bridge rectifier and the first resistor.

4. The circuit of claim 2, wherein the second opto-coupler is coupled to the second bridge rectifier and the second resistor.

5. The circuit of claim 1, wherein the first resistor is coupled to first opto-coupler, an S pin of the first set-reset latch, the voltage source, and a cathode of the first SCR.

6. The circuit of claim 1, wherein a gate of the first SCR is coupled to a Q pin of the first set-reset latch, an anode of the first SCR is coupled to the load, and the cathode of the first SCR is coupled to the first resistor and the first voltage source.

7. The circuit of claim 1, wherein an anode of the first diode is coupled to the first voltage source and a cathode of the first diode is coupled to the load.

8. The circuit of claim 1, further comprising a third resistor coupled to the first voltage source, the first opto-coupler, and an anode of the first diode.

9. The circuit of claim 1, further comprising:
   a first capacitor coupled to a gate of the first SCR and a cathode of the first SCR.

10. The circuit of claim 1, wherein an S pin of the first set-reset latch is coupled to the first opto-coupler and a Q pin of the first set-reset latch is coupled to a gate of the first SCR.

11. The circuit of claim 1, wherein an S pin of the second set-reset latch is coupled to the second opto-coupler and a Q pin of the second set-reset latch is coupled to a gate of the second SCR.

12. The circuit of claim 1, wherein the second resistor is coupled to the second opto- coupler, an S pin of the second set-reset latch, the second voltage source, and a cathode of the second SCR.

13. The circuit of claim 1, wherein a gate of the second SCR is coupled to a Q pin of the second set-reset latch, an anode of the second SCR is coupled to the load, and a cathode of the second SCR is coupled to the second resistor and the second voltage source.

14. The circuit of claim 1, wherein an anode of the second diode is coupled to the second voltage source and a cathode of the second diode is coupled to the load.

15. The circuit of claim 1, further comprising a fourth resistor coupled to the second voltage source, the second opto-coupler, and an anode of the second diode.

16. The circuit of claim 1, further comprising:
   a second capacitor coupled to a gate of the second SCR and a cathode of the second SCR.

17. A circuit, comprising:
   a first bridge rectifier comprising a first, second, third, and fourth nodes, wherein the first and third nodes of the first bridge rectifier are coupled to a first voltage source;
   a first resistor coupled to the second node of the first bridge rectifier;
   a first opto-coupler comprising a first diode and a first transistor, wherein an anode of the first diode is coupled to the first resistor;
   a first set-reset latch comprising an S pin and a Q pin, wherein the S pin is coupled to a cathode of the first diode;
   a second resistor coupled to the cathode of the first diode, the S pin of the first set-reset latch, and the fourth node of the first bridge rectifier;
   a first SCR, wherein a gate of the first SCR is coupled to the Q pin of the first set-reset latch, a cathode of the first SCR is coupled to the second resistor and the fourth node of the first bridge rectifier, and an anode of the first SCR is coupled to a load;
   a second diode, wherein an anode of the second diode is coupled to the second node of the first bridge rectifier and the first resistor, and a cathode of the second diode is coupled to the load;
   a second bridge rectifier comprising a first, second, third, and fourth nodes, wherein the first and third nodes of the second bridge rectifier are coupled to a second voltage source;
   a third resistor coupled to the second node of the second bridge rectifier;
   a second opto-coupler comprising a third diode and a second transistor, wherein an anode of the third diode is coupled to the third resistor, wherein the second transistor is coupled across the second resistor;
   a second set-reset latch comprising an S pin and a Q pin, wherein the S pin of the second set-reset latch is coupled to a cathode of the third diode;
   a fourth resistor coupled to the cathode of the third diode, the S pin of the second set-reset latch, and the fourth node of the second bridge rectifier, wherein the first transistor is coupled across the fourth resistor;
   a second SCR, wherein a gate of the second SCR is coupled to the Q pin of the second set-reset latch, a cathode of the second SCR is coupled to the fourth resistor and the fourth node of the second bridge rectifier, and an anode of the second SCR is coupled to the load; and
   a fourth diode, wherein an anode of the fourth diode is coupled to the second node of the second bridge rectifier and the third resistor, and a cathode of the fourth diode is coupled to the load.

18. A circuit, comprising:

a first bridge rectifier coupled to a first voltage source;

a first opto-coupler coupled to the first bridge rectifier, wherein the first opto-coupler comprises a first diode and a first transistor;

a first set-reset latch coupled to the first diode;

a first resistor coupled to the first diode, the first set-reset latch, and the first bridge rectifier;

a first SCR coupled to the first set-reset latch, the first resistor, the first bridge rectifier, and a load;

a second diode coupled to the first bridge rectifier, the first opto-coupler, and the load;

a second bridge rectifier coupled to a second voltage source;

a second opto-coupler coupled to the second bridge rectifier, wherein the second opto-coupler comprises a third diode and a second transistor, wherein the second transistor is coupled across the first resistor;

a second set-reset latch coupled to the third diode;

a second resistor coupled to the third diode, the second set-reset latch, and the second bridge rectifier, wherein the first transistor is coupled across the second resistor;

a second SCR coupled to the second set-reset latch, the second resistor, the second bridge rectifier, and the load; and a fourth diode coupled to the second bridge rectifier, the second opto-coupler, and the load.

19. The circuit of claim 18, wherein the first voltage source is coupled to a first and second node of the first bridge rectifier.

20. The circuit of claim 18, wherein an anode of the first diode is coupled to a node of the first bridge rectifier and a cathode of the first diode is coupled to the first resistor.

21. The circuit of claim 18, wherein an S pin of the first set-reset latch is coupled to a cathode of the first diode and a Q pin of the first set-reset latch is coupled to a gate of the first SCR.

22. The circuit of claim 18, wherein the first resistor is coupled to a cathode of the first diode, an S pin of the first set-reset latch, a node of the first bridge rectifier, and a cathode of the first SCR.

23. The circuit of claim 18, wherein a gate of the first SCR is coupled to a Q pin of the first set-reset latch, an anode of the first SCR is coupled to the load, and the cathode of the first SCR is coupled to the first resistor and a node of the first bridge rectifier.

24. The circuit of claim 18, wherein an anode of the second diode is coupled to a node of the first bridge rectifier and a cathode of the second diode is coupled to the load.

25. The circuit of claim 18, further comprising a third resistor coupled to a node of the first bridge rectifier, an anode of the first diode, and an anode of the second diode.

26. The circuit of claim 18, further comprising:

a first capacitor coupled to a gate of the first SCR and a cathode of the first SCR.

27. The circuit of claim 26, further comprising:

a second capacitor coupled to a gate of the second SCR and a cathode of the second SCR.

28. The circuit of claim 18, wherein an anode of the third diode is coupled to a node of the second bridge rectifier and a cathode of the third diode is coupled to the second resistor.

29. The circuit of claim 18, wherein an S pin of the second set-reset latch is coupled to a cathode of the third diode and a Q pin of the second set-reset latch is coupled to a gate of the second SCR.

30. The circuit of claim 18, wherein the second resistor is coupled to a cathode of the third diode, an S pin of the second set-reset latch, a node of the second bridge rectifier, and a cathode of the second SCR.

31. The circuit of claim 18, wherein a gate of the second SCR is coupled to a Q pin of the second set-reset latch, an anode of the second SCR is coupled to the load, and a cathode of the second SCR is coupled to the second resistor and a node of the second bridge rectifier.

32. The circuit of claim 18, wherein an anode of the fourth diode is coupled to a node of the second bridge rectifier and a cathode of the fourth diode is coupled to the load.

33. The circuit of claim 18, further comprising a fourth resistor coupled to a node of the second bridge rectifier, an anode of the third diode, and an anode of the fourth diode.

34. The circuit of claim 18, wherein an anode of the fourth diode is coupled to the second bridge rectifier and a cathode of the fourth diode is coupled to the load.

35. The circuit of claim 18, wherein the second voltage source is coupled to a first and second node of the second bridge rectifier.

* * * * *